Nov. 20, 1956     C. T. CROSS     2,771,409
METHOD OF MAKING GRID BEARINGS
Filed Feb. 19, 1953
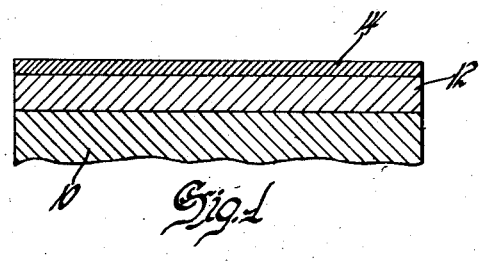
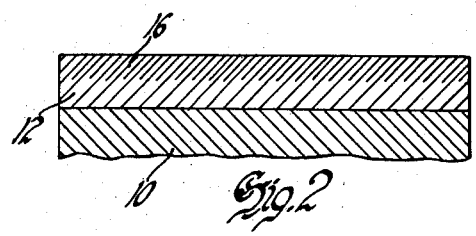
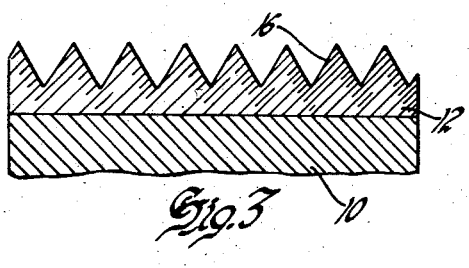
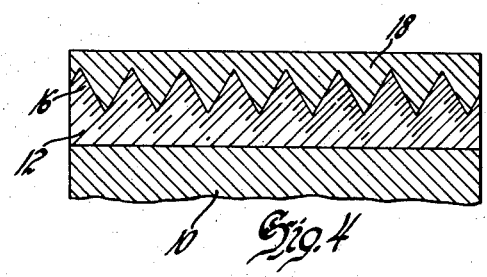
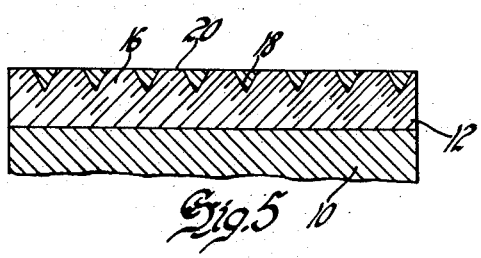
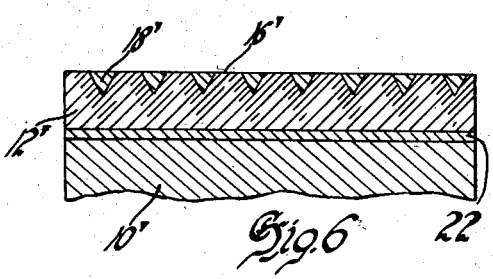
INVENTOR
Charles T. Cross
BY
Willits, Helwig & Baillio
ATTORNEYS

2,771,409
METHOD OF MAKING GRID BEARINGS

Charles T. Cross, Detroit, Mich., assignor to General Motors Corporation, Detroit, Mich., a corporation of Delaware Application February 19, 1953, Serial No. 337,768

7 Claims. (Cl. 204—35)

This invention relates to improvements in grid bearings and more particularly to a method of making grid bearings which are resistant to corrosion.

Grid bearings are characterized by bearing surfaces having a multiplicity of small areas of hard and soft bearing materials arranged in alternating succession circumferentially and preferably also longitudinally with respect to the shaft. The hard material is united with a strong supporting back to enable the bearing to carry heavy loads. This load bearing structure is referred to as the grid or matrix. The areas of soft bearing material preferably are well bonded to the matrix and give the grid bearing desirable frictional properties as well as improved embeddability. Silver has frictional and embeddability characteristics which make it an especially desirable matrix material. However, silver is readily corroded by lubricants which contain sulfur. As a result, the use of silver grid bearings is highly impractical in many applications despite the excellent bearing characteristics of the silver.

Accordingly, it is a principal object of this invention to provide an improved method of forming grid bearings. A further object is to provide an improved method of forming silver grid bearings which are resistant to corrosion caused by lubricants containing sulfur. Other objects and advantages will more fully appear from the description which follows.

According to the present invention, a silver grid bearing which is highly resistant to corrosion caused by lubricants containing sulfur may be obtained by diffusing tin into a silver surface and thereafter forming a multiplicity of grid pits or depressions in the diffused zone. The grid pits are subsequently filled with a soft bearing material to provide a completed grid bearing.

By the method of this invention the silver matrix is provided with a uniformly diffused tin-silver alloy zone having a sufficient depth to withstand abrasive wear encountered in use together with a wear surface which is highly resistant to corrosion.

The practice of the present invention contemplates forming a grid bearing according to the following method:

I first apply a layer of silver by casting, electrodeposition, etc., onto a backing or bearing support member of a harder or stronger metal such as steel or the like. The silver may be applied in any ordinary grid bearing thickness, for example, in a thickness within the thickness range of about 0.005" to 0.100". At present, I prefer to electrodeposit silver in a thickness within the range of about 0.010" to 0.035". In many cases it is desirable to first electrodeposit a flash or strike coating on the backing member over which the silver is then applied in the desired thickness. Such a flash or strike coating, preferably of copper, nickel or the like, aids in forming a strong bond between the silver and the backing member.

For a bearing using a copper strike, a copper thickness of about 0.000020" is preferred with a practical range being about 0.0000050" to 0.000100" in thickness. Using a nickel strike, a nickel thickness of about 0.000010" is presently preferred with the practical range being from about 0.000005" to 0.000100" thickness.

In many instances it is desirable to anneal the silver coating. Where neither a nickel or copper strike is applied, the silver normally is annealed at a temperature of about 975° F. for one hour. In the case of a copper strike it is preferred not to anneal the silver above about 1200° F. to prevent the formation of a relatively weak copper-silver eutectic alloy with a consequent weakening of the bond. When a nickel strike is employed, the maximum annealing temperature is about 1400° F.

Where annealing temperatures of about 1050° F. or higher are employed it is necessary to employ a neutral or reducing atmosphere. At times, temperatures much lower than 975° F. also may be employed. In fact, temperatures down to as low as room temperature may be used in certain cases depending on the characteristics of the silver bearing material.

A thin coating of tin is then electrodeposited over the silver layer. In practice, this coating of tin generally may have a thickness within the range of about 0.00005" to 0.0005". In many cases, a tin coating having a thickness within the range of about 0.0001" to 0.0003" is used. The resulting tin-coated structure is then heat treated at an elevated temperature to cause diffusion of the tin and silver to form an alloy diffusion zone, having a uniform depth throughout, resistant to corrosion caused by lubricants containing sulfur.

Generally, the temperature employed for the diffusion heat-treatment is within the range of approximately 600° to 1000° F. for a time of about ten minutes or more. Where temperatures of not more than about 800° F. are used, extended periods of heat-treatment may be employed, for example, in some cases as much as ten hours or more. The diffusion heat-treatment may be carried out in air, when temperatures of 1000° F. or less are employed. If higher temperatures are used, a neutral or reducing furnace atmosphere should be maintained although a neutral or reducing atmosphere also may be used with lower diffusion temperatures. The upper limit of time at the higher temperatures of 900° to 1000° F. is dictated by the depth of diffusion desired. At present, I prefer to heat treat the tin and silver for about thirty minutes at 800° F.

In many cases it is desirable to bore or machine the bearing to provide a uniform bearing wall thickness before gridding. Grid pits or depressions are formed on its surface in the matrix surface in any suitable manner as by passing the silver bearing under a knurling roll or other roller die capable of forming the desired grid pits. It will be understood, of course, that the grid pits or depressions formed in the silver matrix may be arranged in any desired pattern. Thus, the grid pits or depressions may consist of grooves extending over the surface of the bearing. In another embodiment the surface of the silver matrix may comprise a multiplicity of tin-silver projections which are exposed at the bearing surface to take the load and which are surrounded by soft bearing material. However, a preferred form consists of a silver matrix having a multiplicity of small grid pits or depressions spaced circumferentially and/or longitudinally with respect to the shaft.

To obtain a superior performance with a silver grid bearing formed according to the present invention, it is desirable to provide at least about 15 grid pits per lineal inch in the surface of the alloy diffusion zone. While grid bearings having a very fine grid pattern will support heavy loads and afford longer life, in the case of bearings having more than about 100 grid pits per lineal inch, manufacture is difficult because the pits or depressions are necessarily quite shallow and impose closer tolerances or machining operations. At present, optimum results are obtained in most cases when the number of grid pits per lineal inch is within the range of about 20 to 70.

The grid pits are filled with a soft bearing material by casting, electrodeposition, etc. In a preferred embodiment, the soft bearing material is applied to the gridded surface in a thickness greater than the depth of the grid pits or depressions and a portion of the resulting surface and of the matrix subsequently removed by machining or the like to expose a composite wear surface.

In general, any ordinary soft bearing metal or alloy may be employed, for example, lead-base alloys such as alloys of lead containing small amounts of tin and/or antimony, tin-base alloys or other babbit-type bearing materials. Excellent results are obtained in many applications by using lead-tin alloys or lead-indium alloys. At times, it is desirable to cast a soft bearing material into the grid pits; a preferred alloy for such casting is an alloy consisting essentially of 94% lead, 3% tin, and 3% antimony. At present, I prefer to electrodeposit an alloy of lead and tin, particularly a lead base alloy containing about 7% to 12% tin. As used herein, the expression "bearing material" is intended to include conventional soft bearing metals and/or alloys which can be electrodeposited, cast, or otherwise applied to fill the grid pits.

Referring now to the accompanying drawing:

Fig. 1 is a somewhat schematic, fragmentary, enlarged sectional view of a tin-coated bearing blank showing the several layers of the metals prior to diffusion of the tin and silver;

Fig. 2 is a view similar to Fig. 1 after diffusion of the tin and silver;

Fig. 3 is a somewhat schematic, fragmentary, enlarged sectional view similar to Fig. 2 after the surface has been gridded;

Fig. 4 is a view similar to Fig. 3 except that a layer of soft bearing material has been applied over the gridded surface;

Fig. 5 is a somewhat schematic, enlarged sectional view of a portion of a completed bearing in accordance with the present invention;

Fig. 6 is a view, similar to Fig. 5, of a completed bearing in accordance with another embodiment of the invention in which a metallic bonding layer is shown interposed between the backing material and the silver grid.

Referring more particularly to the drawing, in Figs. 1 through 5 is shown a backing member 10 of a strong metal, such as steel, to which is applied a coating 12 of silver. As shown in Fig. 1, a thin coating 14 of tin is applied over the silver coating. This tin coating is then diffused into the silver by heat-treatment, resulting in the structure as shown in Fig. 2 in which 16 represents an alloy diffusion zone of tin-silver.

After the diffusion heat-treatment, the resulting structure is knurled to provide a gridded structure as shown in Fig. 3. A soft bearing material 18 such as a lead-tin alloy, a lead-indium alloy, etc., is subsequently applied, preferably by electrodeposition, over the gridded surface to provide a structure as shown in Fig. 4. In Fig. 5, illustrating a completed bearing in accordance with the present invention, it will be seen that after the upper portions of the soft bearing material and the apices of the gridded matrix are removed by machining or the like to provide a composite bearing surface, the thickness of the tin-silver alloy diffusion zone 16 provides a uniform corrosion protection for the exposed surfaces 20 of the matrix.

A completed bearing formed in accordance with another embodiment of the invention is shown in Fig. 6. This bearing, while generally similar to the bearing shown in Fig. 5, having a composite wear surface having alternating areas of soft bearing material 18' and diffused tin-silver 16' is provided with a bonding layer 22 of copper, nickel or other metal or alloy intermediate the matrix 12' and backing member 10'. Such a bearing may be formed by the herein-described process except that a flash or strike coat of nickel, copper or other metal or alloy is employed between the backing member and the silver matrix.

The term "silver" as used herein is intended, of course, to include silver-base alloys containing small amounts of alloying ingredients other than silver, as well as commercially pure silver.

It is to be understood that, although the invention has been described with specific reference to particular embodiments thereof, it is not to be so limited since changes and alterations therein may be made which are within the full intended scope as defined by the appended claims.

What is claimed is:

1. A method of forming a grid bearing which comprises the steps of depositing silver onto a backing member, applying a thin coating of tin to the silver, forming a tin-silver alloy diffusion zone by heat treatment, die forming a multiplicity of grid pits in the resulting surface, filling said grid pits with a soft bearing material, and thereafter removing a portion of said diffusion zone and soft bearing material.

2. A method of forming a grid bearing which comprises electrodepositing a thin coating of tin onto a plain silver matrix, heating the silver and tin to an elevated temperature to cause diffusion of the tin and silver, subsequently die forming a multiplicity of grid pits on the resulting surface, electrodepositing a soft bearing material thereon in a thickness greater than the depth of the grid pits, and thereafter removing a portion of the resulting structure to expose a bearing surface having a multiplicity of alternating areas of soft bearing material and diffused tin-silver.

3. A method of forming a grid bearing comprising applying a thin coating of tin to a plain silver matrix, heating the resulting structure at a temperature within the range of about 600° to 1000° F. for a time sufficient to cause diffusion of the tin and silver, die forming a multiplicity of grid pits in the surface of the resulting structure, filling said grid pits with a soft bearing material, and thereafter machining off a portion of the diffused tin-silver and soft bearing material.

4. A method as in claim 3 in which the soft bearing material is applied by electrodeposition.

5. A method of forming a grid bearing which comprises the steps of electrodepositing a coating of silver onto a backing member, annealing the silver, electrodepositing a thin coating of tin onto said annealed silver, diffusing the tin and silver by heat-treatment to form a tin-silver alloy diffusion zone, subsequently die forming a multiplicity of small grid pits in the alloy diffusion zone of the resulting structure, electrodepositing a soft bearing material onto the resulting surface to at least completely fill the grid pits, and thereafter removing a portion of said diffusion zone and soft bearing material.

6. A method of forming a grid bearing which comprises the steps of electrodepositing, on a strong backing member of steel, a coating of silver in a thickness within the range of about 0.005 to 0.100 inch, annealing said silver coating, electrodepositing tin thereon in a thickness within the range of about 0.00005 to 0.0005 inch, heat treating the tin and silver at a temperature within the range of about 600° to 1000° F. for a time of at least 10 minutes to form a tin-silver alloy diffusion zone, thereafter die forming a multiplicity of grid pits in the alloy diffusion zone, applying a soft bearing material to fill said grid pits, and subsequently machining off a portion of said soft bearing material and diffusion zone to provide a bearing surface comprising a multiplicity of alternating small areas of said soft bearing material and said tin-silver alloy.

7. A method of forming a grid bearing which is highly resistant to corrosion caused by lubricants containing sulfur, said method comprising electrodepositing a flash coating of a metal selected from the class consisting of nickel, nickel base alloys, copper and copper base alloys onto a steel backing member, electrodepositing a layer of silver having a thickness between 0.01 inch and 0.035 inch onto said flash coating, annealing said silver layer, electrodepositing over said annealed silver layer a coating of tin having a thickness between 0.0001 inch and 0.0003 inch, thereafter diffusing the tin into said silver by heat treatment for at least ten minutes at a temperature within the range of approximately 600° F. to 1000° F. to thereby form a tin-silver diffusion zone on the surface of said silver, subsequently die forming 20 to 70 circumferentially and transversely spaced grid pits per lineal inch in said diffusion zone, thereafter applying to the formed gridded surface a layer of a soft lead-base bearing alloy having a thickness greater than the depth of said grid pits, and finally machining off a portion of said lead-base alloy and diffusion zone to expose a bearing surface which comprises a multiplicity of alternating small areas of said lead-base alloy and tin-silver.

References Cited in the file of this patent

UNITED STATES PATENTS

| | | |
|---|---|---|
| 2,187,755 | Ryder | Jan. 23, 1940 |
| 2,241,789 | Queneau et al. | May 13, 1941 |
| 2,431,430 | Shaw | Nov. 25, 1947 |
| 2,621,988 | Donley | Dec. 16, 1952 |